United States Patent [19]
Stargardter

[11] 4,080,823
[45] Mar. 28, 1978

[54] VIBRATION MEASUREMENT
[75] Inventor: Hans Stargardter, Bloomfield, Conn.
[73] Assignee: United Technologies Corporation, Hartford, Conn.
[21] Appl. No.: 739,391
[22] Filed: Nov. 5, 1976
[51] Int. Cl.² .............................................. G01H 1/00
[52] U.S. Cl. ........................................ 73/655; 73/656
[58] Field of Search ................ 73/67, 67.2, 71.3; 356/154, 167; 416/61

[56] References Cited
U.S. PATENT DOCUMENTS

| 1,082,014 | 12/1913 | Digby et al. | 73/71.3 |
| 2,959,956 | 11/1960 | Sweeney et al. | 73/71.3 |

FOREIGN PATENT DOCUMENTS

| 1,446,960 | 6/1966 | France | 416/61 |
| 1,353,732 | 5/1974 | United Kingdom | 73/71.3 |

Primary Examiner—Jerry W. Myracle
Assistant Examiner—John P. Beauchamp
Attorney, Agent, or Firm—Robert C. Walker

[57] ABSTRACT

Apparatus and methods for measuring deflection of rotating fan blades of a gas turbine engine is disclosed. The measurement of bending and torsional deformation in response to integral and to nonintegral vibration as well as to structural loading is developed. Optical measuring techniques including the projection of collimated light beams into the fan section of the engine are employed. A linear readout of angular deflection is displayed on a distant screen for amplification of the actual deflection. The plurality of beams provide a deflection profile covering the full surface of the blade.

14 Claims, 11 Drawing Figures

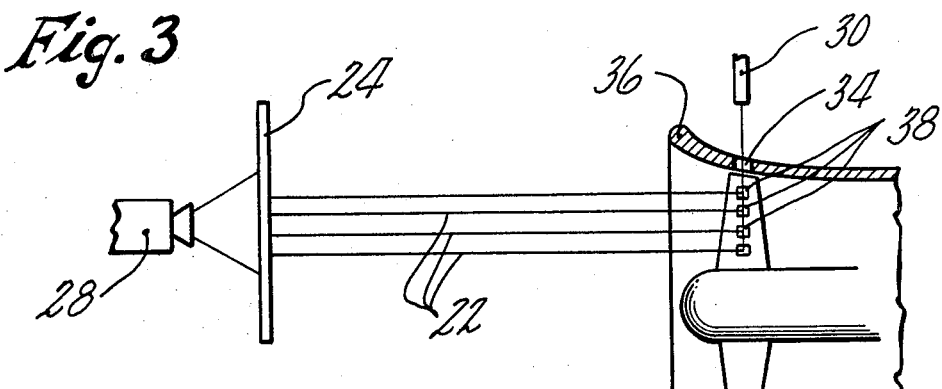
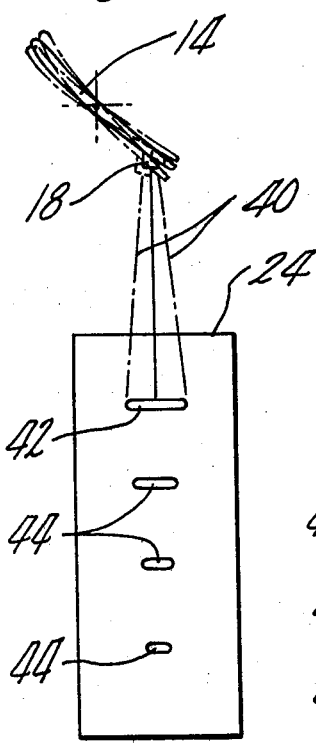
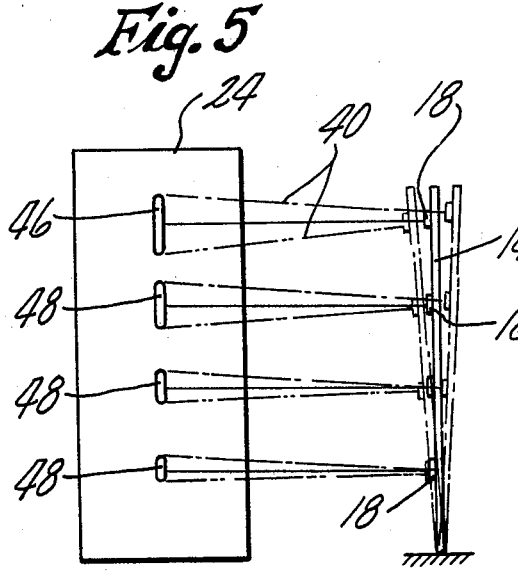
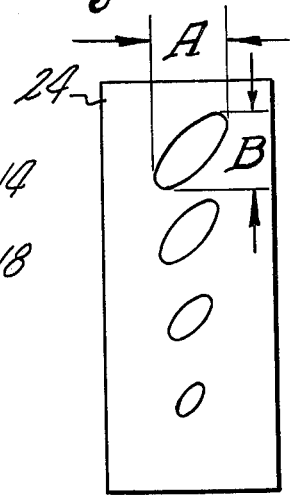

VIBRATION MEASUREMENT

BACKGROUND OF THE INVENTION

1. Field of the Invention

This invention relates to deflection of blades in a rotary machine and, more particularly, to methods and apparatus for measuring the amplitude of deflection of operating blades.

2. Description of the Prior Art

Scientists and engineers within the turbine engine field have long recognized that vibratory damage adversely limits the life of many turbine machines. They have also recognized that the blades of the rotor assembly are among the most susceptible of compressor components to vibratory damage. The blades are of necessity designed for low weight in order to minimize the centrifugallly generated loads on the rotor. Lightweight blades, however, are not always compatible with the durability requirements of the engine and may severely limit the operating life of the engine where adverse vibratory stimuli induce radical deflections in the blades.

The frequency of the adverse stimuli may be an integral multiple or a nonintegral multiple of the speed of the engine rotor is revolutions per minute (RPM). Integral vibratory stimuli are principally produced as a result of nonuniform pressure patterns upstream of the blades. As each blade is cycled from a low loading condition to a higher loading condition, the variation produced causes the blades to cyclically deflect and a strain is imposed on the blade material. One particularly distinctive form of integral vibration is known as "resonance". At resonance, the natural frequency of the installed blade is coincident with the frequency of the stimuli. The deflection amplitudes become reinforcing and the likelihood of vibratory damage is substantially increased.

Nonintegral vibration may occur at any speed and, in a most destructive mode, is referred to in the industry as "flutter". During flutter, self-excitation of the blades occurs as unsteady forces and moments created by periodic blade deflections do positive work on the blading. The periodic blade vibration may consist of blade bending or torsion or a combination of the two.

Structurally improved blade designs making judicious use of material are possible where accurate measurement of blade deflection enhances the understanding of vibratory effects. Collaterally, the measurement of airfoil deformation in response to gas pressure and centrifugal loadings enables improved aerodynamic designs.

SUMMARY OF THE INVENTION

A primary aim of the present invention is to provide methods and apparatus for optimizing the design of blades for a rotary machine, such as a gas turbine engine. Accurate measurement of blade deflections in response to structural and vibratory loads is sought and, in one form, a specific object is to obtain optical measurements which are representative of the deflection profile over the full profile of the blade during steady state and vibratory conditions.

According to the present invention, a plurality of reflecting surfaces are positioned on a blade of a rotary machine so as to be capable of intercepting a plurality of corresponding, collimated light beams, and of directing said beams to a remotely positioned viewing device to display a light pattern which is representative of the torsional and bending deformations of the blade in response to vibratory stimuli and structural loading.

A primary feature of the present invention is the plurality of reflecting surfaces on the blade to be measured. Spanwise and chordwise reflectors are employable. Another feature is the source of collimated light which is adapted to direct light onto each reflecting surface. The remotely positioned screen intercepts the plurality of reflected beams to display a deflection pattern which is representative of the blade profile under changing vibratory and structural loadings.

A principal advantage of the present invention is the ability to measure, with the apparatus and methods taught herein, blade deflections in an operating machine. A profile of deflection of the entire surface of the blade is obtainable. Deflections in response to steady state loads and to both integral and nonintegral vibration are measurable. Only minimal aerodynamic perturbations in the flow path are produced as a result of the measurement apparatus. The resulting optical pattern is amplifiable by projecting the pattern to a remotely positioned screen. The projected pattern represents the amplitude of both bending and torsional deflections of the blade. Linear dimensions in the pattern are convertible to angular deflections of the blade.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 3 is an alternate embodiment of apparatus constructed in accordance with the present invention;

FIG. 4 is a simplified illustration showing the measurement of torsional deflection amplitude of a blade in the first torsional mode;

FIG. 5 is a simplified illustration showing the measurement of bending deflection amplitude of a blade in the first bending mode;

FIG. 6 is an illustration of combined bending and torsional deflection amplitude measurement for nonintegral vibration.

DESCRIPTION OF THE PREFERRED EMBODIMENT

Figure 1:
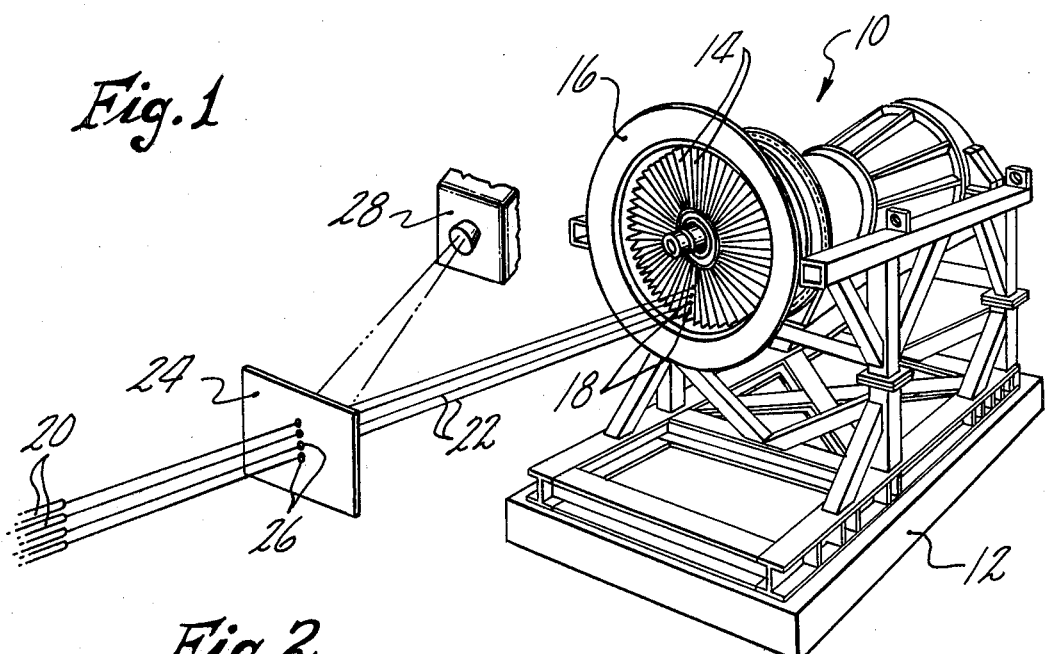
FIG. 1 is a simplified illustration of apparatus constructed to employ the techniques of the present invention.

Simplified apparatus for measuring torsional and bending deflection in the fan blades of a gas turbine engine is illustrated in FIG. 1. The gas turbine engine 10 is mounted on a frame 12. The fan blades 14 are viewable through the inlet 16 of the engine. One of the fan blades has, on the surface thereof, a plurality of reflecting surfaces 18. Each of the reflecting surfaces may be formed of a mirror attached to the blades or may merely be a highly polished piece of the blade itself.

A plurality of sources 20 of collimated light beams 22 are in optical alignment with the reflecting surfaces 18. A display screen 24, having a plurality of apertures 26 in the embodiment shown through which the beams 22 are transmittable, is disposed across the path of the reflected beams. Optical viewing or recording means 28 is positioned relative to the screen to document the linear representation of angular deflection as presented by the reflected beams on the display screen. The viewing or recording means may be any suitable means such as a still, movie camera or a television-type display. Similarly, the display screen may be formed of a diode array capable of digitizing the movement of the intercepted light beam to provide a direct readout of deflection amplitude.

Figure 2:
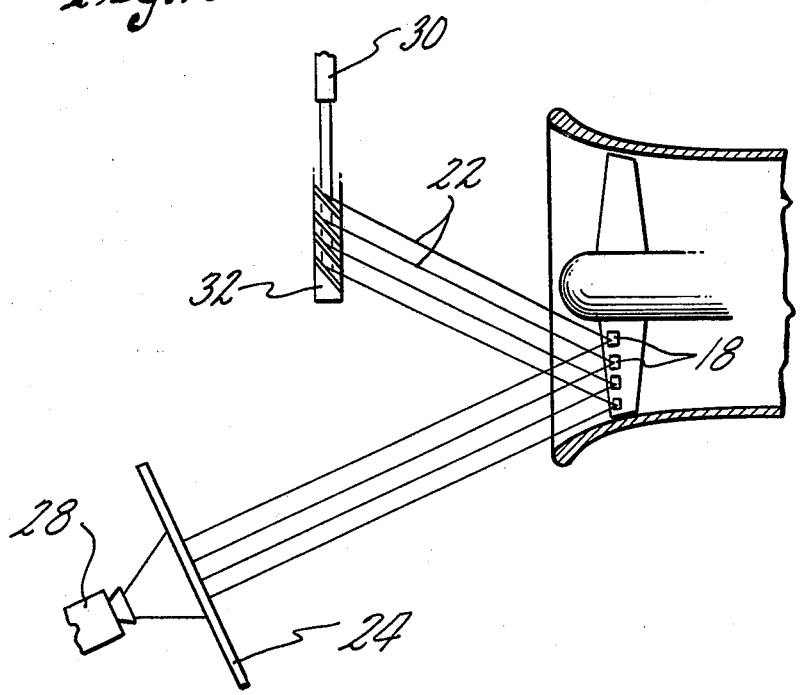
FIG. 2 is an alternate embodiment of apparatus constructed in accordance with the present invention.

In an alternate embodiment a single source 30 of collimated light energy is aligned with a beam splitter 32. The beam splitter intercepts and redirects a portion of the energy from the single source to provide the plurality of light beams 22. As in FIG. 1, the beams are reflectable from the surfaces 18 onto the screen 24. Optical viewing or recording means 28 is positioned to document the linear representation of angular deflection displayed on the screen. As illustrated in the FIG. 2 embodiment, the screen may be fabricated of a translucent material so as to make the projected deflection profile pattern viewable from behind the screen. Suitable viewing or recording means 28, such as a camera, may be disposed behind the screen. As in FIG. 1, the display screen may be formed of a diode array capable of digitizing the movement of the intercepted light beam to provide a direct readout of deflection amplitude.

Yet another embodiment of the invention is illustrated by FIG. 3. A single source 30 of collimated light energy is aligned through an aperture 34 in the fan case 36 with a plurality of diffraction gratings 38. Each grating is adapted to direct light energy striking the grating toward the screen 24. The angle of incidence of the light energy striking the diffraction grating need not be equal to the angle of reflection therefrom. The screen may be fabricated of a translucent material so as to make the projected deflection pattern viewable from behind the screen. Viewing or recording means 28, such as a camera, may be disposed behind the screen. As in FIGS. 1 and 2, the display screen may be formed of a diode array capable of digitizing the light beam on the screen to provide a direct readout of deflection amplitude.

In one embodiment the reflecting surfaces 18 are formed by mirrors adhered to the blade 14. In an alternative embodiment local areas of the parent blade material are polished to form integral reflecting surfaces. In both embodiments only minimal aerodynamic perturbations in the flow path are produced by the measurement and accurate measurement is assured.

The measurement of deflection due to nonintegral vibration is illustrated by FIGS. 4 and 5. A point image is produced on the screen for each revolution of the engine as the reflecting surface 18 intercepts and reflects the light beam. In FIG. 4 torsional deflection of the blade 14 causes linear displacement of the image of the reflected beam 40 appearing on the screen 24. The locus of image points displayed on the screen forms a horizontal line 42. The additional three horizontal lines 44 shown on the screen of FIG. 4 illustrate the loci of points formed by the reflections from the three additional surfaces 18 disposed inwardly along the span of the blade. Deflection in the first torsional mode is illustrated although it will be clear to those skilled in the art that deflection in other torsional modes may be similarly measured. The length of the line 42 is proportional to the angular deflection of the blade 14. The comparatively lesser lengths of the lines 44 illustrate lesser deflection inwardly along the span of the blade. A blade deflection profile is thusly obtainable.

In FIG. 5 bending deflection of the blade 14 causes linear displacement of the image of the reflected beam 40 appearing on the screen 24. The locus of image points displayed on the screen forms a vertical line 46. The additional three vertical lines 48 shown on the screen 24 of FIG. 5 illustrate the loci of points formed by the reflection from the three additional surfaces 18 disposed inwardly along the span of the blade. Deflection of the blade in the first bending mode is illustrated although it will be clear to those skilled in the art that deflection in other bending modes may be similarly measured. The length of the line 46 is proportional to the angular deflection of the reflecting surface 18 carried by the blade 14. The comparatively lesser lengths of the vertical lines 48 illustrate lesser deflections inwardly along the span of the blade.

A composite representation of the torsional and bending deflections of FIGS. 4 and 5 is illustrated on the screen 24 of FIG. 6. The loci of points form a plurality of elipses as bending deflection and torsional deflection vary in the operating blade system. In the composite image the horizontal width A represents the maximum torsional deflection and the vertical width B represents the maximum bending deflection. The width of the minor axis of the elipse varies with the phase differential between maximum torsional deflection and maximum bending deflection. A slanted line image is produced when the maximum torsional deflection and the maximum bending deflection are in phase.

Figure 7A:
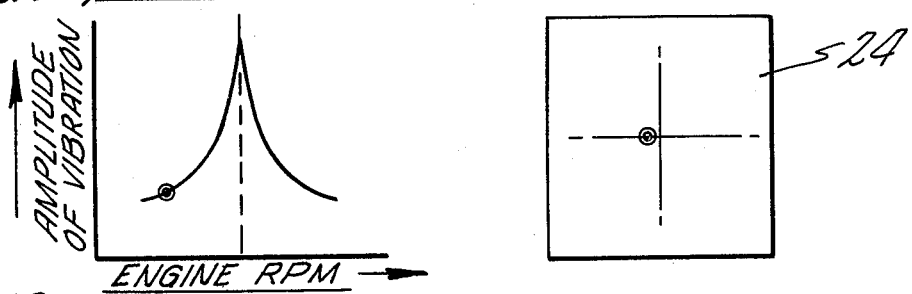
FIGS. 7A-7E are sequential illustrations of amplitude measurement of resonant integral vibration.
Figure 7B:
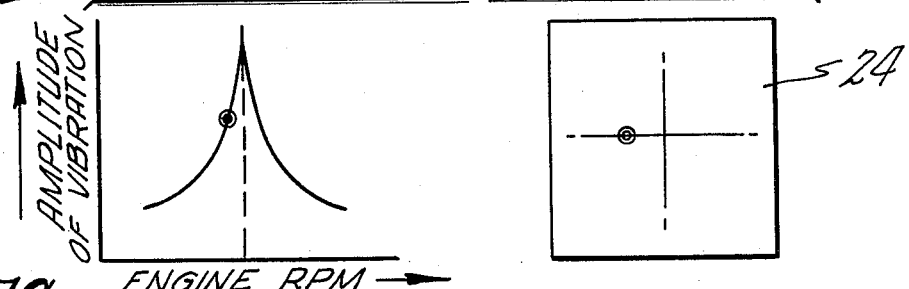
Figure 7C:
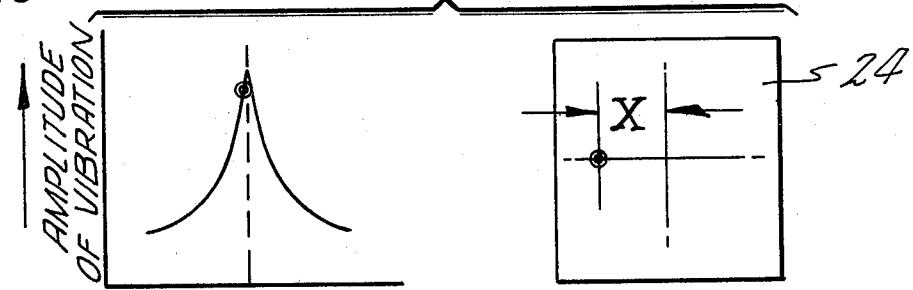
Figure 7D:
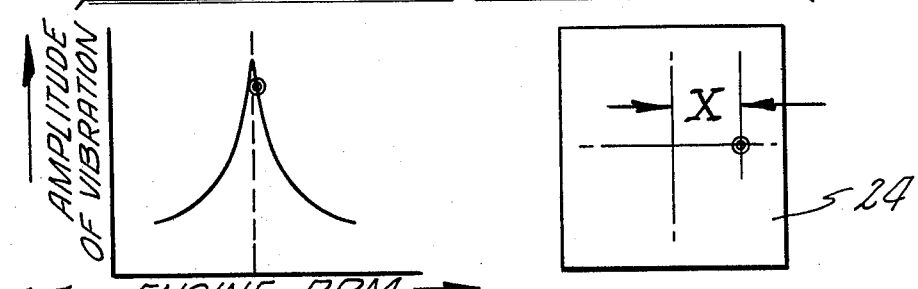
Figure 7E:
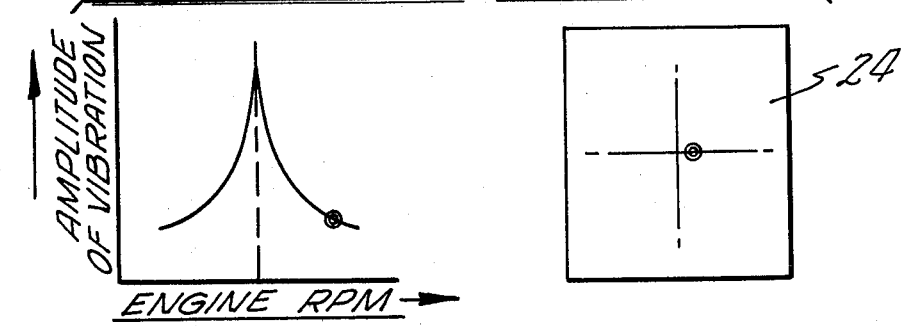

In forming deflection profiles at nonintegral frequencies, the image shown on the screen represents the maximum amplitude of the deflection in bending and in torsion. The technique for gauging the maximum amplitude of deflection at resonant integral frequencies is illustrated by FIGS. 7A-7E. The amplitude of deflection of the blade in response to integral frequency stimuli remains constant as a standing wave is developed in the blade system. Accordingly, the image displayed on the screen 24 is a spot which may or may not be representative of the maximum amplitude. In FIG. 7A a plot of the amplitude of vibration as a function of engine RPM is shown. The peak represents a precise resonant frequency at which deflection is to be measured. Below the resonant frequency the amplitude of vibration is small and a correspondingly small deflection is measured on the screen 24. As the engine RPM is increased the amplitude increases until just before the resonant frequency, the displacement X as shown on the screen of FIG. 7C is at a maximum. As soon as the engine RPM exceeds the resonant frequency the image of the beam as displayed on the screen 24 moves abruptly to a displacement X on the other side of the neutral axis. The excursion of the intercepted beam as the system passes through resonance defines a measurable linear displacement (2X) which is representative of the deflection of the blade as excited by the resonant vibration at the circumferential position illuminated. Illumination at more than one circumferential position may be required to locate and measure the maximum deflection. A timed exposure photograph may be useful in measuring the 2X displacement.

The optimum distance between the screen 24 and the reflecting surfaces 18 is determined by the signal amplification desired. As the distance between the screen and the surfaces is increased the physical size of the image on the screen is proportionately increased. It has been found that positioning the screen at a distance of 20 feet from the surfaces produces an image on the screen which is on the order of 6 inches and accurate measurement is assured.

Steady state deflection in response to aerodynamic and centrifugal loading is incorporated in the measurements of vibratory deflection as described above. At engine RPM's intermediate to those producing significant vibratory deflection, linear displacement of the reflected light on the screen represents increased or decreased deflection due to structural and aerodynamic loads. Accordingly, a profile of the blade contour during operation may be developed and the results applied to the design of new airfoils having improved aerodynamic characteristics.

The apparatus disclosed is further useful in determining the interblade phase angle between adjacent blades. A second blade is equipped with reflecting surfaces and the angular lag in deflection between the first and second blade is determined. The equipped blades may be remote or adjacent with the phase lag calculated on the basis of the number of blades in the system.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. Apparatus for measuring torsional and bending deflection in a rotating blade of an operating rotary machine, comprising:
   a plurality of reflecting surfaces spaced along the surface of the blade to be measured;
   means for directing a collimated beam of light energy into the path of each reflecting surface so as to be reflected by each of said surfaces at each machine revolution; and
   a display screen spaced from the blade for intercepting the beams reflected from the surfaces to display a composite pattern of the multiple reflections which is representative of torsional and bending deflection along the surface of the blade.

2. The invention according to claim 1 wherein said means for directing a beam of light energy comprises an array of individual light sources, each source being directed at an individual reflecting surface.

3. The invention according to claim 1 wherein said means for directing a beam of light energy comprises a single source of collimated light energy and an array of beam splitters which are adapted to direct a portion of the light energy emanated from said collimated beam to each of the individual reflecting surfaces.

4. The invention according to claim 1 wherein each of said reflecting surfaces is a diffraction grating and said means for directing a beam of collimated light energy comprises a single source of energy which is projected upon the diffraction gratings.

5. The invention according to claim 1 wherein said means for directing a beam of light energy is optically positioned behind said screen and wherein said screen is formed to allow the passage of said beam of collimated light energy therethrough.

6. The invention according to claim 5 wherein said screen has at least one aperture disposed therein.

7. The invention according to claim 1 which further comprises recording means disposed in operative relationship to said screen for recording the composite pattern produced during operation.

8. The invention according to claim 2 which further comprises recording means disposed in operative relationship to said screen for recording the composite pattern produced during operation.

9. The invention according to claim 3 which further comprises recording means disposed in operative relationship to said screen for recording the composite pattern produced during operation.

10. The invention according to claim 1 wherein said screen is positioned at approximately 20 feet from said reflecting surfaces.

11. The invention according to claim 2 wherein said screen is positioned at approximately 20 feet from said reflecting surfaces.

12. The invention according to claim 3 wherein said screen is positioned at approximately 20 feet from said reflecting surfaces.

13. A method for measuring the angular deflection of a rotor blade in a blade system subjected to nonintegral vibration, which comprises the steps of:
   disposing a plurality of reflecting surfaces along the span of the blade on which deflection is to be measured;
   rotating the blade system at an operational speed at which nonintegral vibration is produced;
   directing a beam of collimated light energy against each of said reflecting surfaces;
   reflecting said beam to a display screen to visually display the pattern of reflected light energy produced in response to torsional and bending deflection of the blade;
   measuring the linear dimensions of the displayed pattern; and
   relating the measured linear dimensions to angular deflection of the blade.

14. A method for measuring the angular deflection of a rotor blade in a blade system subjected to resonant vibration, which comprises the steps of:
   disposing a plurality of reflecting surfaces along the span of the blade on which deflection is to be measured;
   rotating the blade system at an operational speed just below the speed at which peak resonant vibration is produced;
   directing a beam of collimated light energy against each of said reflecting surfaces;
   reflecting said beam to a display screen to visually display a first position of the reflected beam on the screen;
   recording said first position of the reflected beam;
   rotating the blade system at an operational speed just above the speed at which peak resonant vibration is produced;
   reflecting said beam to a display screen to visually display a second position of the reflected beam on the screen;
   recording said second position of the reflected beam;
   determining the linear distance between said first and second portions; and
   relating said linear distance to angular deflection of the blade.

* * * * *